US011260302B2

(12) United States Patent
Lee et al.

(10) Patent No.: US 11,260,302 B2
(45) Date of Patent: Mar. 1, 2022

(54) APPARATUS AND METHOD OF CREATING AGENT IN GAME ENVIRONMENT

(71) Applicant: Electronics and Telecommunications Research Institute, Daejeon (KR)

(72) Inventors: Sang Kwang Lee, Daejeon (KR); Seong Il Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 65 days.

(21) Appl. No.: 16/707,781

(22) Filed: Dec. 9, 2019

(65) Prior Publication Data

US 2020/0179808 A1 Jun. 11, 2020

(30) Foreign Application Priority Data

Dec. 10, 2018 (KR) .................. 10-2018-0158085

(51) Int. Cl.
| | |
|---|---|
| *A63F 13/67* | (2014.01) |
| *A63F 13/798* | (2014.01) |
| *A63F 13/58* | (2014.01) |
| *G06N 20/00* | (2019.01) |
| *A63F 13/35* | (2014.01) |
| *G06K 9/62* | (2022.01) |

(52) U.S. Cl.
CPC .............. *A63F 13/67* (2014.09); *A63F 13/35* (2014.09); *A63F 13/58* (2014.09); *A63F 13/798* (2014.09); *G06K 9/6218* (2013.01); *G06N 20/00* (2019.01); *A63F 2300/407* (2013.01); *A63F 2300/634* (2013.01)

(58) Field of Classification Search
CPC ......... A63F 13/67; A63F 13/798; A63F 13/58
See application file for complete search history.

(56) References Cited

U.S. PATENT DOCUMENTS

| 6,561,513 | B1 * | 5/2003 | DeGeorge | ........... A63F 3/00075 273/262 |
| 8,348,733 | B2 | 1/2013 | Kim et al. | |
| 8,425,330 | B1 * | 4/2013 | Kislyi | .................. A63F 13/795 463/42 |

(Continued)

FOREIGN PATENT DOCUMENTS

| JP | 2013202419 A | 10/2013 |
| KR | 1020120075527 A | 7/2012 |

OTHER PUBLICATIONS

Tom Minka et al., TrueSkill 2 An improved Bayesian skill rating system, Mar. 22, 2018, pp. 1-24.

*Primary Examiner* — James S. McClellan
(74) *Attorney, Agent, or Firm* — William Park & Associates Ltd.

(57) ABSTRACT

An agent creating method of creating an agent in a game environment is provided. The agent creating method includes creating, by an agent creating apparatus, a base agent on the basis of a common action characteristic pattern of players to transfer the base agent to the game server, receiving, by the agent creating apparatus, match result data obtained by performing a match between the base agent and a character of an individual player, and performing, by the agent creating apparatus, machine learning by using the match result data and creating an evolved agent customized for matchmaking of the individual player on the basis of a result of the machine learning.

9 Claims, 4 Drawing Sheets

(56) References Cited

U.S. PATENT DOCUMENTS

| | | |
|---|---|---|
| 2012/0129595 A1 | 5/2012 | Kim et al. |
| 2016/0001181 A1* | 1/2016 | Marr .................. G07F 17/3272 463/42 |
| 2016/0166935 A1* | 6/2016 | Condrey ................ A63F 13/48 463/31 |
| 2018/0093191 A1 | 4/2018 | Lee |

* cited by examiner

APPARATUS AND METHOD OF CREATING AGENT IN GAME ENVIRONMENT

CROSS-REFERENCE TO RELATED APPLICATIONS

This application claims priority under 35 U.S.C. § 119 to Korean Patent Application No. 10-2018-0158085, filed on Dec. 10, 2018, the disclosure of which is incorporated herein by reference in its entirety.

TECHNICAL FIELD

The present invention relates to technology for creating an agent in a game environment.

BACKGROUND

Player versus player (PvP) content in a game environment is an antonym of player versus environment (PvE) content and denotes content associated with an action in a game competing with a character of a player differing from a character of a player.

Representative examples of a PvP matchmaking method include Arpad Elo's ELO rating system and Microsoft Research's TrueSkill 2. Such methods calculate relative skill levels of players so as to determine a priority of an in-game player. That is, such a system is a system which determines relative priorities for matchmaking between players. Due to this, when the number of players playing in a game is small, a deviation caused by matchmaking is large.

Moreover, when the above-described methods are applied to player versus environment (PvE), only a ready match agent is matched based on each player skill level, and due to this, it is unable to precisely respond to a player characteristic.

In the patent document, an agent-based game service apparatus and method (Korean Patent Publication No. 10-2012-0075527) has been disclosed. The patent document relates to an agent-based game service apparatus and method which creates an agent of a non-player character (NPC) type from game log data and applies the created agent to a game, thereby allowing the agent to perform a game instead of a player. In the patent document, an agent based on each player and a game play pattern-based agent are independently operated and selected, and due to this, it is difficult to create a match agent sufficiently customized for the action characteristic of each player.

SUMMARY

Accordingly, the present invention provides an apparatus and method of creating an agent customized for the action characteristic of each player.

In one general aspect, an agent creating method of an agent creating apparatus for creating an agent in a game environment to provide the agent to a game server includes creating, by the agent creating apparatus, a base agent on the basis of a common action characteristic pattern of players to transfer the base agent to the game server; receiving, by the agent creating apparatus, match result data obtained by performing a match between the base agent and a character of an individual player; and performing, by the agent creating apparatus, machine learning by using the match result data and creating an evolved agent customized for matchmaking of the individual player on the basis of a result of the machine learning.

In another general aspect, an agent creating apparatus for creating an agent in a game environment includes: a storage configured to collect game log data transferred from a game server; and a learning processor configured to create a base agent for matchmaking of players on the basis of the game log data, transfer the base agent to the game server, receive match result data, obtained by performing a match between the base agent and a character of an individual player, from the game server, perform machine learning by using the match result data, and create an evolved agent customized for matchmaking of the individual player on the basis of a result of the machine learning.

Other features and aspects will be apparent from the following detailed description, the drawings, and the claims.

DETAILED DESCRIPTION OF EMBODIMENTS

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

Hereinafter, an apparatus and method of creating an agent in a game environment according to various embodiments will be described with reference to the accompanying drawings. Herein, the term "agent" is used, and an agent may be defined as a software component associated with a target object performing a match with a character manipulated by a player. Particularly, the term "evolved agent" herein may be defined as an intelligent agent which autonomously performs learning on the basis of artificial intelligence, instead of providing a simple service to a player unlike an agent of an NPC type, and is autonomously evolved into a target customized for an action characteristic pattern associated with a match action (a battle action) of a player in a game.

Figure 1:
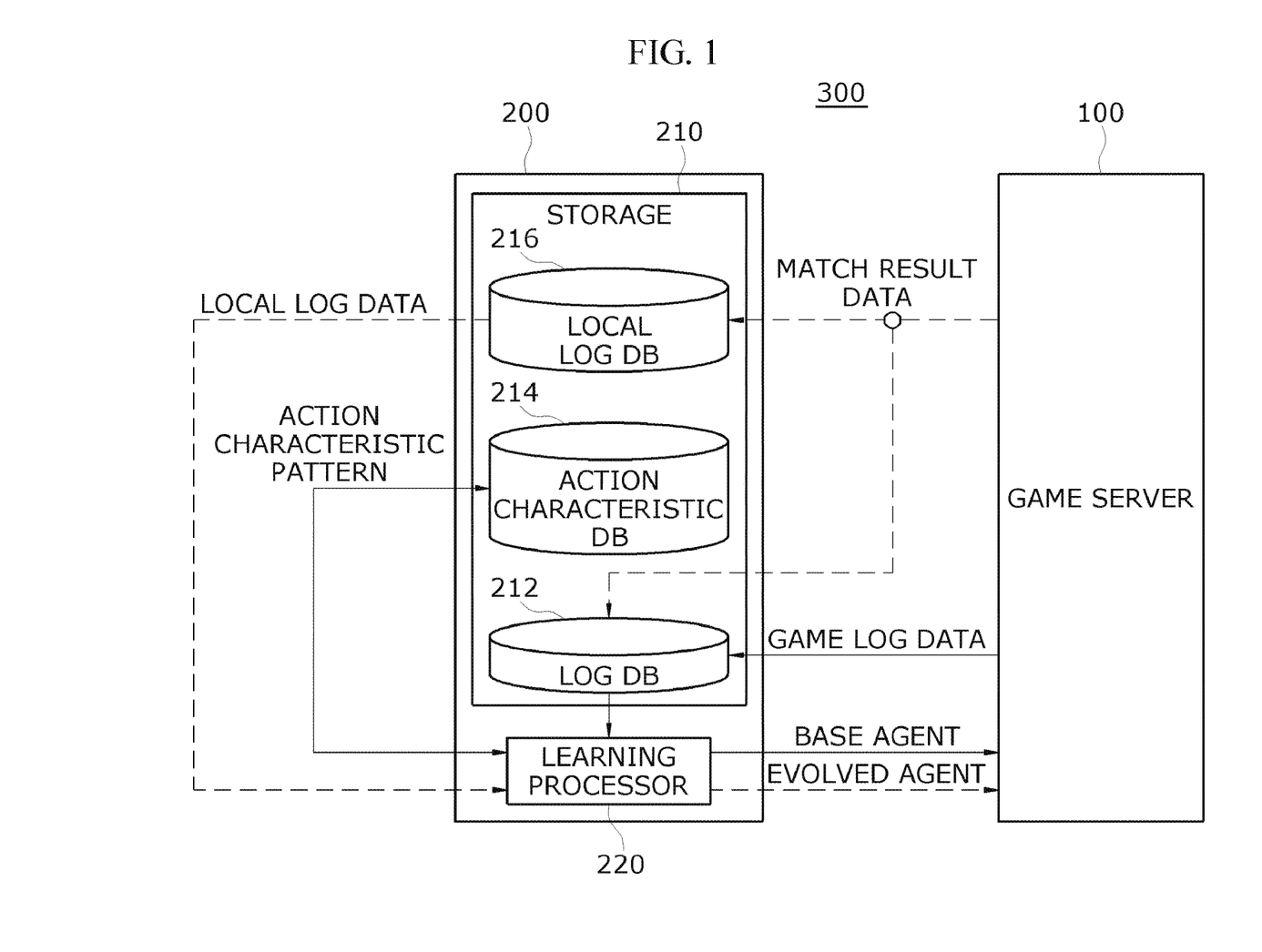
FIG. 1 is a block diagram illustrating a game system including an apparatus for creating an agent in a game environment, according to an embodiment of the present invention.

FIG. 1 is a block diagram illustrating a game system 300 including an apparatus for creating an agent in a game environment, according to an embodiment of the present invention.

Referring to FIG. 1, the game system 300 according to an embodiment of the present invention may include a game server 100 and an agent creating apparatus 200.

The game server 100 may be a computing apparatus for providing an online game to a logged-in player and may provide (transfer) game log data of an individual player to the agent creating apparatus 200. The game log data may include player information (user information), data associated with player-based character ability, and data associated with a player-based game play pattern.

The data associated with the player-based character ability may include, for example, data associated with an attacking force, an experience level, a defensive force, a life force, and the kind of retained skill.

The data associated with player-based character ability may include data associated with an attack play pattern of an agent performed by a character of a player and data associated with a defense play pattern.

The data associated with the attack play pattern may include, for example, data associated with the number of attacks applied to an agent, damage applied to a target object, and an input value (a manipulation value of a keyboard, a mouse, or the like) which is input by a player for attacking an agent.

The data associated with the defense play pattern may include, for example, data associated with the number of use of defense skill (for example, passive skill) used for defending an attack of an agent and the number a manipulation value of a keyboard, a mouse, or the like) of movements for avoiding the attack of the agent.

Moreover, the game server 100 may provide matchmaking for a match between a character of a player and an agent and may provide match content between a character of a player and an agent matched with each other.

Moreover, the game server 100 may provide the agent creating apparatus 200 with a result (hereinafter referred to as match result data) obtained by performing a match between a character of a player and an agent matched with each other.

The agent creating apparatus 200 may intelligently create an evolved agent customized for matchmaking of an individual player (or an individual character) on the basis of game log data and match result data provided from the game server 100.

To this end, the agent creating apparatus 200 may include a storage 210 and a learning processor 220.

The storage 210 may store a log database (DB) 212, an action characteristic DB 214, and a local log DB 216.

The log DB 212 may store the game log data provided from the game server 100. The log DB 212 may store an action characteristic pattern of each player (character) analyzed based on the game log data by the learning processor 220. The local log DB 216 may store the match result data provided from the game server 100. Here, the match result data will be described below and may denote result data obtained by performing a match between each player (character) and an agent.

The learning processor 220 may perform machine learning on the basis of the game log data stored in the log DB 212 and the match result data stored in the local log DB 216 and may create an evolved agent customized for matchmaking of each individual player (or an individual character) on the basis of a result obtained by performing the machine learning. In this case, the machine learning may include supervised learning and unsupervised learning.

The learning processor 220 may again provide the learning processor 220 with the evolved agent, for a match between the evolved agent and an individual player (or an individual character), and the game server 100 may again provide the learning processor 220 with updated match result data based on a match action between the evolved agent and an individual player (or an individual character).

The learning processor 220 may again perform machine learning on the basis of the updated match result data and may more evolve the evolved agent customized for matchmaking of each individual player (or an individual character) on the basis of a result of the performing.

As described above, as a match action between an individual player (or an individual character) and an agent is repeated, the learning processor 220 may scalably evolve an agent so that the agent is customized for matchmaking of each individual player (or an individual character).

Hereinafter, the learning processor 220 will be described in more detail with reference to FIG. 2.

Figure 2:
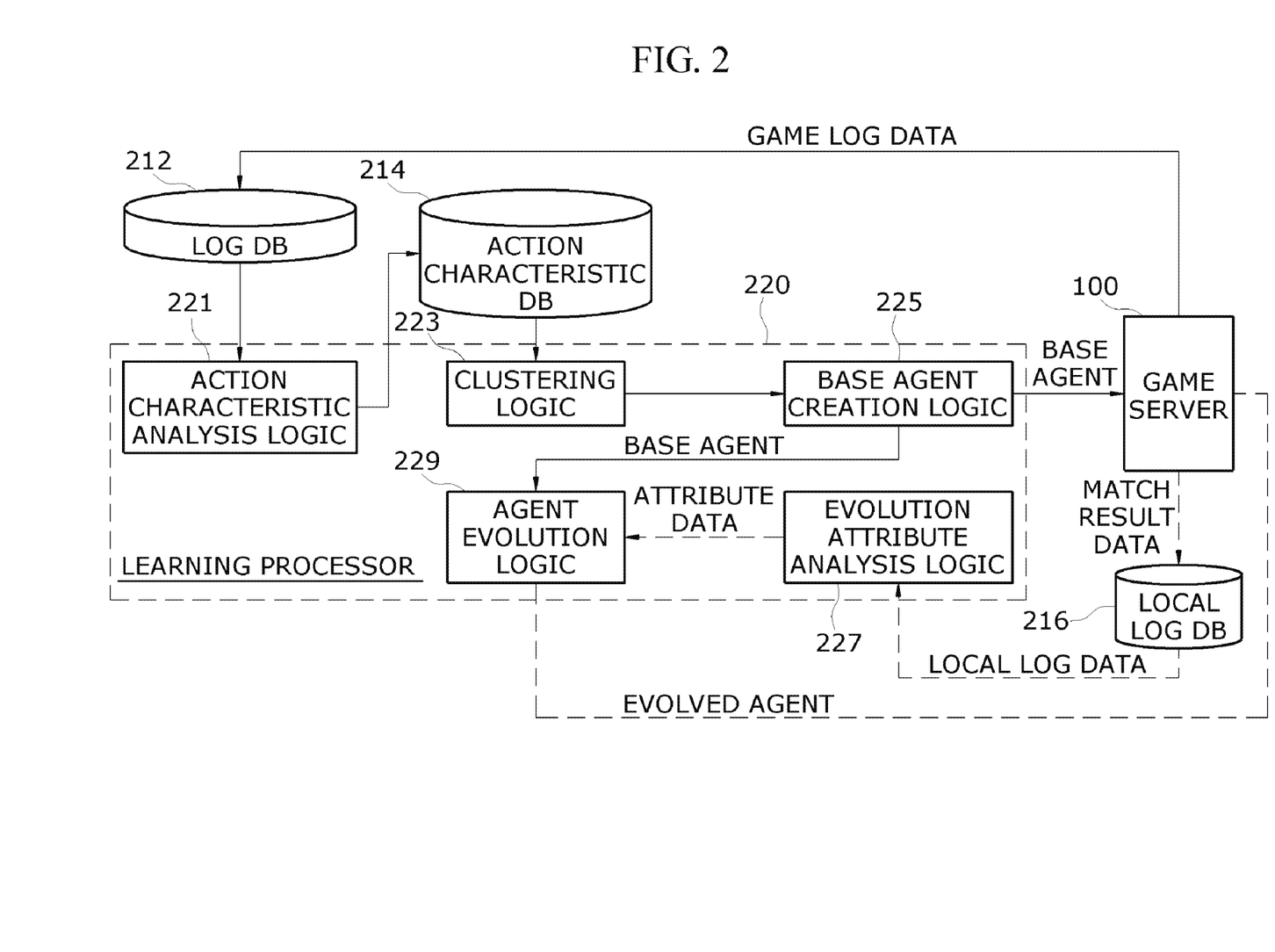
FIG. 2 is a block diagram illustrating an internal logic of a learning processor according to an embodiment of the present invention.

FIG. 2 is a block diagram illustrating an internal logic of the learning processor 220 according to an embodiment of the present invention.

Referring to FIG. 2, the learning processor 220 may be implemented with a system on chip (SoC) or a system in package (SiP). The learning processor 220 may execute, for example, various data processing, an arithmetic operation, and an algorithm for creating an evolved agent by driving an operating system (OS) or an application program.

The learning processor 220 may be configured with a plurality of internal logics divided in units of functions, for creating an agent to be customized for matchmaking of each individual player (or an individual character).

The internal logics illustrated in FIG. 2 is merely divided in units of functions, for helping understand description, and it is not limited that the learning processor 220 is configured with the internal logics illustrated in FIG. 2. Therefore, some logics illustrated in FIG. 2 may be included in another logic, or may be included in the game server 100.

Moreover, the storage 210 storing the DBs 212, 214, and 216 and the learning processor 220 may be included in the game server 100.

The learning processor 220 may include an action characteristic analysis logic 221, a clustering logic 223, a base agent creation logic 225, an evolution attribute analysis logic 227, and an agent evolution logic 229.

The action characteristic analysis logic 221 may analyze a pattern, a rule, and a relationship of the game log data stored in the log DB 212 to generate action characteristic patterns of players. The action characteristic patterns may each be, for example, a vector value expressed in an n-dimensional vector space.

The vector value may be calculated from the game log data by using data mining (or a data conversion algorithm) associated with data dimension conversion (for example, data dimension reduction). The data conversion algorithm is not a feature of the present invention, and thus, technology known to those skilled in the art is applied to its description.

The clustering logic 223 may cluster the players into a plurality of clusters on the basis of a common action characteristic pattern (an action characteristic pattern having high similarity) of players. For example, the clustering logic 223 may cluster the players into a plurality of clusters by using a method of clustering the players into a plurality of clusters having high similarity among action characteristic patterns (vector values) of the players created by the action characteristic analysis logic 221.

A method of clustering the players into a plurality of clusters may use partitional clustering (for example, K-means clustering), hierarchical clustering, self-organizing map, spectral clustering, etc.

The base agent creation logic 225 may create a base agent corresponding to each of the clusters generated by the clustering logic 223. In this case, the base agent may be a base agent representing each cluster. For example, the base agent may be an agent corresponding to a representative value of each cluster. The representative value may be a representative value of vector values included in each cluster and may be a center value or an average value of the vector values.

A correspondence relationship between the representative value and the base agent may be set based on a matchmaking table which is initially set. The matchmaking table may be a table including an ability value (an attacking force, a life force, a physical force, a defensive force, etc.) of the base agent set in units of representative values. The matchmaking may be stored in an arbitrary storage area of the storage 210.

As described above, the base agent may be an agent representing each cluster and may be an agent corresponding to a common action characteristic pattern (a common attack play pattern and a common defense player pattern) of players, instead of an agent optimized for matchmaking with an individual player.

The base agent creation logic 225 may provide the base agent to the game server 100 on the basis of a request of the game server 100, or may provide the base agent to the game server 100 in real time, without the request of the game server 100.

The game server 100 may receive base agents created in units of clusters from the base agent creation logic 225 and may execute matchmaking between an individual player and a base agent by using a method of selecting a base agent from among the received base agents on the basis of a cluster including an individual player.

A match request of an individual player may be an action where a character of an individual player enters a specific zone of a game. When a character enters a specific zone (a dungeon or a hunting ground in a game) of a game, the game server 100 may recognize a corresponding action as a match request of an individual player and may execute a match between an individual player and a base agent by using a method of presenting a base agent corresponding to a cluster where an individual player is in a specific zone.

When the match between the individual player and the base agent is completed, the game server 100 may create match result data obtained by performing a match between the base agent and a character of the individual player and may store the match result data in the local log DB 216 and the log DB 212 of the storage 210. In this case, the match result data stored in the local log DB 216 may be stored as local log data, and the match result data stored in the log DB 212 may be stored as a type which is included in the game log data.

When the character death of an individual player, killing of a base agent, or an event deviating from a specific zone which an individual agent enters for a match occurs, a match between an individual player and a base agent may be completed.

Match result data generated based on match completion may include, for example, an ability (an item ability, an attacking force, a life force, a defensive force, and the kind of retained skill each possessed by a character) of a character manipulated by the individual player, an ability (a level, an attacking force, a life force, a defensive force, and the kind of retained skill) of the base agent, the kind of skill which is used by the base agent in a match process, damage of the base agent caused by the character, damage of the character caused by the base agent, a life force of the base agent remaining at a death time of the character, a life force of the character remaining at a killing time of the base agent, the number of attacks of the character on the base agent until a death time of the base agent, a time taken until the death time of the base agent, the number of movements of the character performed for avoiding an attack of the base agent in the match process, and the number of draughts used for supplementing physical strength of the character in the match process performed on the base agent.

The match result data may include a result generated by performing a match between an individual player (a character) and a base agent and may be recognized as an individual action characteristic pattern of an individual player.

The evolution attribute analysis logic 227 may analyze the match result data included in the local log data stored in the local log DB 216 to extract attribute data for evolving the base agent. In this case, the attribute data may be data needed for customizing the base agent to matchmaking of the individual player, and for example, may be data associated with a reduction in ability (an attaching force, a skill attacking force, critical damage (a decisive attaching force), a defensive force, and a life force) of the base agent.

The agent evolution logic 229 may perform machine learning by using, as inputs, the attribute data from the evolution attribute analysis logic 227 and the base agent from the base agent creation logic 225 and may predict and create an evolved agent customized for matchmaking of an individual player on the basis of a result obtained by performing the machine learning. In this case, the machine learning may include supervised learning and unsupervised learning and may be combination learning thereof. Examples of the machine learning may include a deep neural network (deep learning).

Considering a process until the agent evolution logic 229 creates an evolved agent, it may be considered that the agent creating apparatus 200 according to an embodiment of the present invention creates the evolved agent on the basis of a base agent created based on a common action characteristic pattern of players included in the same cluster and an individual action characteristic pattern of an individual player based on a result of a match performed on the base agent and the individual player (an individual character).

Therefore, in the agent creating apparatus 200 according to an embodiment of the present invention, a process of creating an agent corresponding to a character of each player and a process of creating an agent in units of game play patterns of each player may not independently be performed, and an agent may be created based on individual action characteristic patterns and a common action characteristic pattern of players. In this regard, the agent creating apparatus 200 according to an embodiment of the present invention may have a difference with the prior art reference.

Due to such a difference, the agent creating apparatus 200 according to an embodiment of the present invention may sufficiently provide a technical effect of creating a match agent sufficiently customized for an individual player action characteristic pattern.

Furthermore, as a match (a battle) between an individual player (a character) and an agent is repeated, the agent creating apparatus 200 according to an embodiment of the present invention may create an agent (i.e., a scalably evolved agent) more precisely customized for an action characteristic pattern of the individual player.

In detail, an evolved agent initially created by the agent evolution logic 229 may be transferred to the game server 100, and the game server 100 may generate updated match result data by performing a match between the initially created evolved agent and the individual player and may perform machine learning by using the generated updated match result data and a previous evolved agent through a processing operation of each of the evolution attribute analysis logic 227 and the agent evolution logic 229, thereby creating a more evolved agent customized for matchmaking of the individual player than the previous evolved agent.

Therefore, as a match (a battle) between an individual player (a character) and an agent is repeated, the agent creating apparatus 200 according to an embodiment of the present invention may create an agent (i.e., a scalably evolved agent) more precisely customized for an action characteristic pattern of the individual player.

Figure 3:
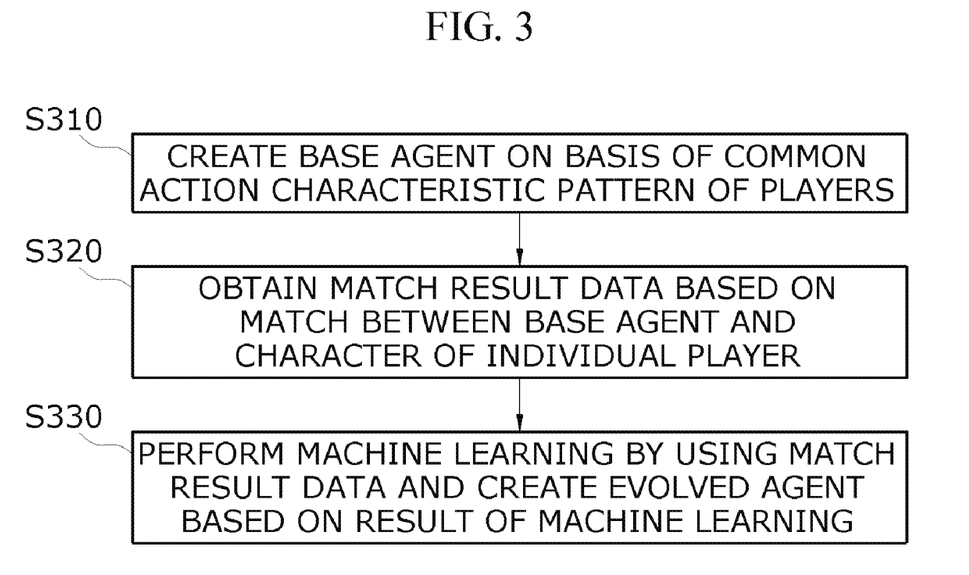
FIG. 3 is a flowchart illustrating a method of creating an agent in a game environment, according to an embodiment of the present invention.

FIG. 3 is a flowchart illustrating a method of creating an agent in a game environment, according to an embodiment of the present invention.

Referring to FIG. 3, first, in step S310, the agent creating apparatus 200 or the learning processor 220 may perform a process of creating a base agent on the basis of a common action characteristic pattern of players and transferring the base agent to a game server.

Subsequently, in step S320, the agent creating apparatus 200 or the learning processor 220 may perform a process of receiving match result data, obtained by performing a match between the base agent and a character of the individual player, from the game server.

Subsequently, in step S330, the agent creating apparatus 200 or the learning processor 220 may perform a process of performing machine learning by using the match result data and creating an evolved agent customized for matchmaking of the individual player on the basis of a result of the machine learning.

After step S330, the agent creating apparatus 200 or the learning processor 220 may perform a process of transferring the evolved agent to the game server.

Subsequently, agent creating apparatus 200 or the learning processor 220 may perform a process of receiving updated match result data, obtained by performing a match between the evolved agent and the character of the individual player, from the game server.

Subsequently, the agent creating apparatus 200 or the learning processor 220 may perform a process of performing machine learning on the basis of the updated match result data and scalably evolving the evolved agent on the basis of a result of the machine learning.

Figure 4:
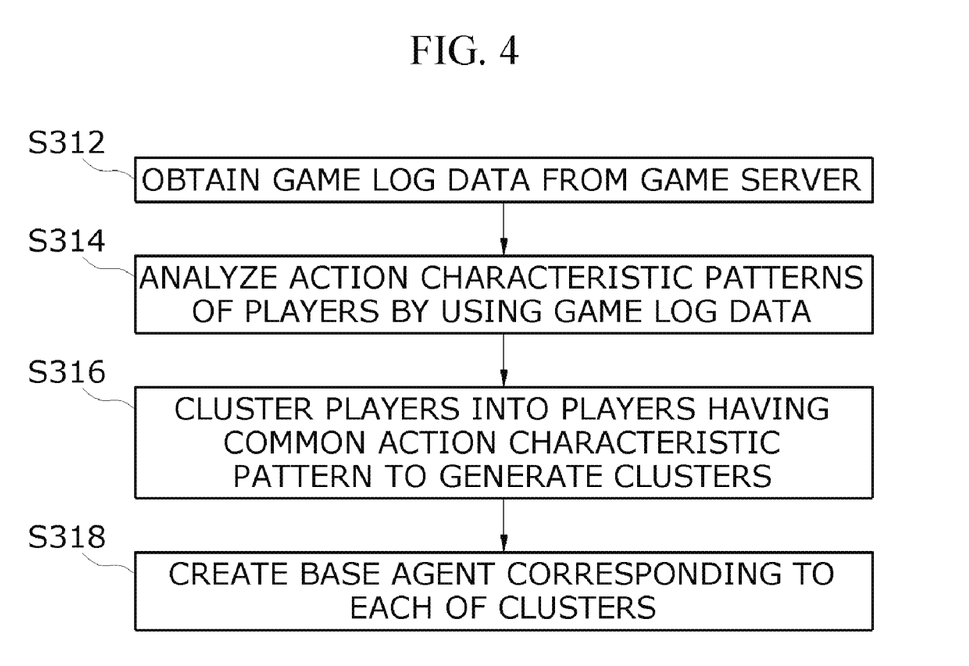
FIG. 4 is a detailed flowchart of step S310 illustrated in FIG. 3.

FIG. 4 is a detailed flowchart of step S310 illustrated in FIG. 3.

Referring to FIG. 4, first, in step S312, a process of obtaining game log data of players from a game server may be performed.

Subsequently, in step S314, a process of analyzing action characteristic patterns of the players on the basis of the game log data may be performed.

Subsequently, in step S316, a process of clustering the players into players having the common action characteristic pattern into the plurality of clusters on the basis of a result obtained by analyzing the action characteristic pattern of each of the players may be performed.

Subsequently, in step S318, a process of creating the base agent corresponding to each of the clusters may be performed.

Figure 5:
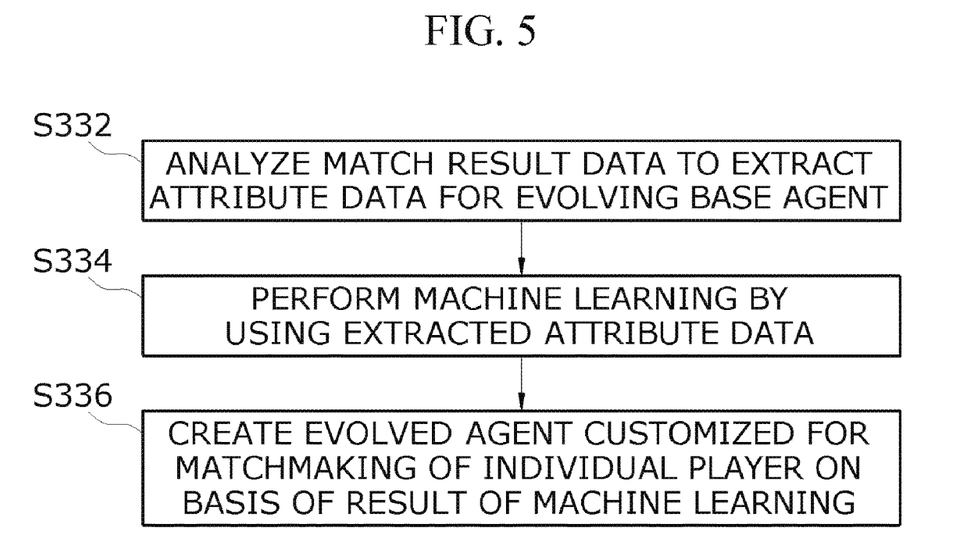
FIG. 5 is a detailed flowchart of step S330 illustrated in FIG. 3.

FIG. 5 is a detailed flowchart of step S330 illustrated in FIG. 3.

Referring to FIG. 5, in step S332, a process of analyzing the match result data to extract attribute data for evolving the base agent may be performed.

Subsequently, in step S334, a process of performing machine learning by using the extracted attribute data may be performed.

Subsequently, in step S336, a process of creating an evolved agent customized for matchmaking of the individual player on the basis of a result of the machine learning may be performed.

Figure 6:
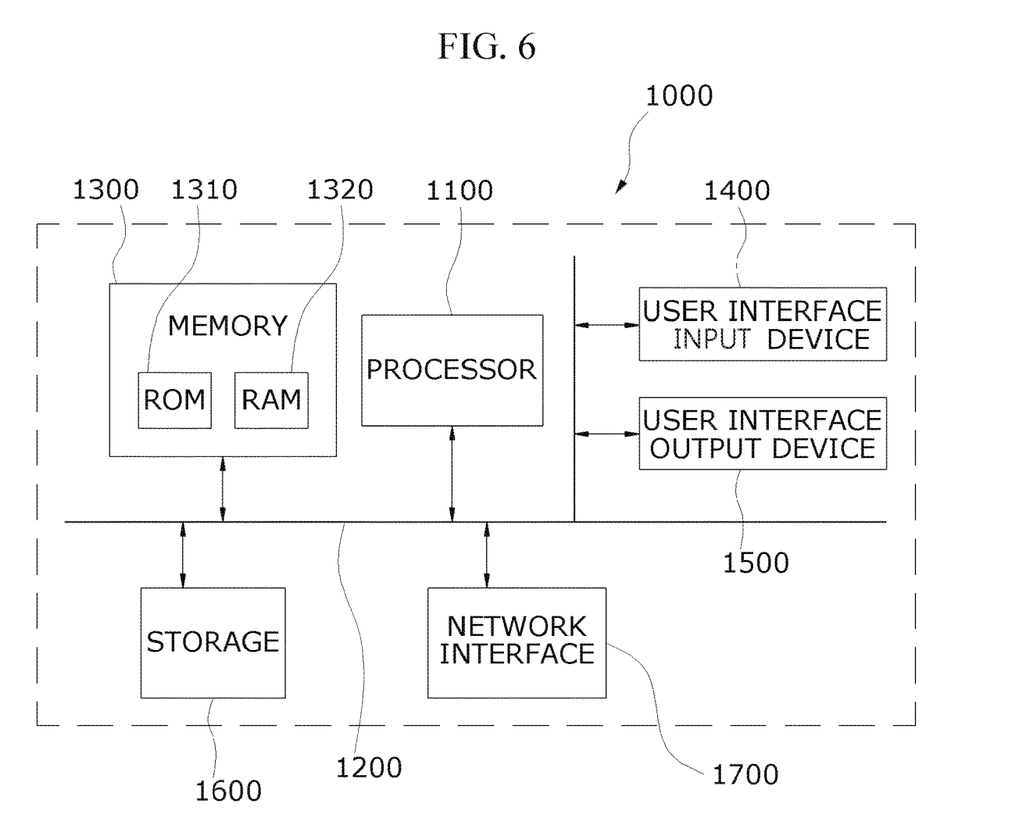
FIG. 6 is a block diagram illustrating a computing system for executing an agent creating method according to an embodiment of the present invention.

FIG. 6 is a block diagram illustrating a computing system 1000 for executing an agent creating method according to an embodiment of the present invention.

Referring to FIG. 6, the computing system 1000 may include at least one processor 1100, a memory 1300, a user interface input device 1400, a user interface output device 1500, a storage 1600, and a network interface 1700, which are connected to one another through a bus 1200.

The processor 1100 may be a semiconductor device for executing instructions stored in a central processing unit (CPU) or the memory 1300 and/or the storage 1600. The instructions may be relevant to creating an evolved agent.

Each of the memory 1300 and the storage 1600 may store the DBs 212, 214, and 216 illustrated in FIGS. 1 and 2 and may include various kinds of volatile or non-volatile storage mediums. For example, the memory 1300 may include read only memory (ROM) and random access memory (RAM).

Therefore, a method or a step of an algorithm described above in association with embodiments disclosed in the present specification may be directly implemented with hardware, a software module, or a combination thereof, which is executed by the processor 1100. The software module may be provided in RAM, flash memory, ROM, erasable programmable read only memory (EPROM), electrical erasable programmable read only memory (EEPROM), a register, a hard disk, an attachable/detachable disk, or a storage medium (i.e., the memory 1300 and/or the storage 1600) such as CD-ROM. An exemplary storage medium may be coupled to the processor 1100, and the processor 1100 may read out information from the storage medium and may write information in the storage medium. In other embodiments, the storage medium may be provided as one body with the processor 1100. The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences. In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

According to the embodiments of the present invention, as a match (a battle) between a player and an agent is continuously performed, an agent better customized for each player action characteristic pattern may be created, thereby enhancing the game immersion of players and increasing the profit of a game service provider.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An agent creating method of an agent creating apparatus for creating an agent in a game environment to provide the agent to a game server, the agent creating method comprising:
   creating, by the agent creating apparatus, a base agent with an ability value based on a common action characteristic pattern of players to transfer the base agent to the game server;
   receiving, by the agent creating apparatus, match result data obtained by performing a match between the base agent and a character of an individual player; and
   performing, by the agent creating apparatus, machine learning by using the match result data and creating an evolved agent customized for matchmaking of the individual player on the basis of a result of the machine learning,
   wherein the common action characteristic pattern comprises a common attack play pattern and a common defense play pattern of the players,
   wherein the creating of the evolved agent comprises:
   analyzing the match result data to extract attribute data for evolving the base agent; and
   performing machine learning by using the extracted attribute data and creating an evolved agent customized for matchmaking of the individual player on the basis of a result of the machine learning,
   wherein the attribute data is data associated with a reduction in an attacking force, a skill attacking force, a decisive attacking force a defensive force, and a life force of the base agent.

2. The agent creating method of claim 1, further comprising,
   after the creating of the evolved agent, transferring, by the agent creating apparatus, the evolved agent to the game server;
   receiving, by the agent creating apparatus, updated match result data which is obtained by performing a match between the evolved agent and the character of the individual player and is transferred from the game server; and
   performing, by the agent creating apparatus, machine learning on the basis of the updated match result data and scalably evolving the evolved agent on the basis of a result of the machine learning.

3. The agent creating method of claim 1, wherein the transferring of the game server comprises:
   clustering the players into a plurality of clusters on the basis of the common action characteristic pattern of the players; and
   creating the base agent corresponding to each of the plurality of clusters.

4. The agent creating method of claim 3, wherein the clustering comprises:
   receiving game log data of the players from the game server;
   analyzing action characteristic patterns of the players on the basis of the game log data; and
   clustering the players into players having the common action characteristic pattern of the players to generate a plurality of clusters, based on the action characteristic pattern of each of the players.

5. The agent creating method of claim 1, wherein the match result data comprises an item ability, an attacking force, a life force, a defensive force, and a kind of retained skill each possessed by a character of a character manipulated by the individual player, a level, an attacking force, a life force, a defensive force, and a kind of retained skill of the base agent, a kind of skill which is used by the base agent in a match process, damage of the base agent caused by the character, damage of the character caused by the base agent, a life force of the base agent remaining at a death time of the character, a life force of the character remaining at a killing time of the base agent, number of attacks of the character on the base agent until a death time of the base agent, a time taken until the death time of the base agent, number of movements of the character performed for avoiding an attack of the base agent in the match process, and number of draughts used for supplementing physical strength of the character in the match process performed on the base agent.

6. An agent creating apparatus for creating an agent in a game environment, the agent creating apparatus comprising:
a storage configured to collect game log data transferred from a game server; and
a learning processor configured to create a base agent for matchmaking of players on the basis of the game log data, transfer the base agent to the game server, receive match result data, obtained by performing a match between the base agent and a character of an individual player, from the game server, perform machine learning by using the match result data, and create an evolved agent customized for matchmaking of the individual player on the basis of a result of the machine learning,
wherein the learning processor comprises:
an evolution attribute analysis logic configured to analyze the match result data to extract attribute data for evolving the base agent; and
an agent evolution logic configured to perform machine learning by using the extracted attribute data and create an evolved agent customized for matchmaking of the individual player on the basis of a result of the machine learning,
wherein the evolution attribute analysis logic extracts the attribute data associated with a reduction in an attacking force, a skill attacking force, a decisive attacking force, a defensive force, and a life force of the base agent.

7. The agent creating apparatus of claim 6, wherein the learning processor transfers the evolved agent to the game server, receives updated match result data which is obtained by performing a match between the evolved agent and the character of the individual player and is transferred from the game server, performs machine learning on the basis of the updated match result data, and scalably evolves the evolved agent on the basis of a result of the machine learning.

8. The agent creating apparatus of claim 6, wherein the learning processor clusters the players into a plurality of clusters on the basis of a common action characteristic pattern of the players and creates the base agent corresponding to each of the plurality of clusters.

9. The agent creating apparatus of claim 8, wherein the learning processor comprises:
an action characteristic analysis logic configured to receive game log data of the players from the storage and analyze action characteristic patterns of the players by using the game log data; and
a clustering logic configured to cluster the players into players having the common action characteristic pattern of the players to generate a plurality of clusters, based on the action characteristic pattern of each of the players.

* * * * *